United States Patent
Kannapan

(10) Patent No.: US 11,321,496 B2
(45) Date of Patent: May 3, 2022

(54) DISTRIBUTED ATTITUDE CONTROL SYSTEM FOR RECONFIGURABLE SPACECRAFT COMPOSED OF JOINED ENTITIES WITH COMPLIANT COUPLING

(71) Applicant: The Aerospace Corporation, El Segundo, CA (US)

(72) Inventor: Deepti Mandyam Kannapan, Redondo Beach, CA (US)

(73) Assignee: THE AEROSPACE CORPORATION, El Segundo, CA (US)

( * ) Notice: Subject to any disclaimer, the term of this patent is extended or adjusted under 35 U.S.C. 154(b) by 429 days.

(21) Appl. No.: 16/255,107

(22) Filed: Jan. 23, 2019

(65) Prior Publication Data

US 2020/0233929 A1 Jul. 23, 2020

(51) Int. Cl.
*G06F 17/16* (2006.01)
*G06F 17/11* (2006.01)
(Continued)

(52) U.S. Cl.
CPC ............... *G06F 30/00* (2020.01); *B64G 1/24* (2013.01); *G06F 17/11* (2013.01); *G06F 17/16* (2013.01);
(Continued)

(58) Field of Classification Search
CPC .......... G06F 30/00; G06F 17/16; G06F 17/11; G06F 2111/04; G06F 30/15;
(Continued)

(56) References Cited

U.S. PATENT DOCUMENTS 5,779,195 A   7/1998   Basuthakur et al.
9,231,323 B1  1/2016   Jaeger
(Continued)

OTHER PUBLICATIONS

Romanishin et al., "M-Blocks: Momentum-Driven, Magnetic Modular Robots", 2013 IEEE/RSJ International Conference on Intelligent Robots and Systems (IROS) Nov. 3-7, 2013. Tokyo, Japan.
(Continued)

*Primary Examiner* — Juan C Ochoa
(74) *Attorney, Agent, or Firm* — LeonardPatel PC

(57) ABSTRACT

A process to design an attitude control system (ACS) controller in each of a plurality of joined entities includes identifying a worst case configuration as a design-to configuration as one or more configurations in a given set S of configurations required for a spacecraft. For the design-to configuration, the process includes deriving one or more system equations in a functional form of equations to determine intermediate design parameters that represent effective proportional and derivative gains of the combined controller, Kp and Kd, respectively. The process also includes determining the design parameters of the ACS controller, namely, gains Kq and Kω and stiffness and damping coefficients, Ks and Cd respectively of all the interfaces between each of the plurality of joined entities, from the intermediate design parameters Kp and Kd. The process further includes programming the ACS controller with selected values of the design parameters for matrices Kq and Kω and selecting springs with stiffness Ks and dampers with damping coefficient Cd for all interfaces between each of the plurality of joined entities. The process includes iterating the computer-implemented process after incrementing a convergence requirement parameter cthreshold when the control performance is not acceptable and until the system achieves acceptable performance, and
(Continued)

programming the ACS controller for each of the plurality of joined entities.

38 Claims, 10 Drawing Sheets

(51) Int. Cl.
*G06F 30/00* (2020.01)
*B64G 1/24* (2006.01)
*G06F 111/04* (2020.01)

(52) U.S. Cl.
CPC .... *B64G 2001/245* (2013.01); *G06F 2111/04* (2020.01)

(58) Field of Classification Search
CPC . G06F 2119/02; B64G 1/24; B64G 2001/245; B64G 2001/1092; B64G 1/244
USPC .......................................................... 703/8, 2
See application file for complete search history.

(56) References Cited

U.S. PATENT DOCUMENTS

| | | |
|---|---|---|
| 2008/0228332 A1 | 9/2008 | Hindle et al. |
| 2008/0237399 A1 | 10/2008 | Caplin et al. |
| 2014/0190387 A1* | 7/2014 | Snow .................... B63B 39/061 114/285 |
| 2015/0027814 A1 | 1/2015 | Benosman |
| 2015/0290995 A1* | 10/2015 | Kanda ................ B60G 17/0182 701/37 |
| 2016/0001849 A1* | 1/2016 | Snow .................... B63B 39/061 114/285 |
| 2018/0290769 A1* | 10/2018 | Mori ...................... B64G 1/443 |
| 2019/0177010 A1* | 6/2019 | Park .......................... B64F 5/60 |

OTHER PUBLICATIONS

Underwood, et al., Using Cube-Sat/Micro-Satellite Technology to Demonstrate the Autonomous Assembly of a Reconfigurable Space Telescope (AAReST), Acta Astronautica, 114 (2015) 112-122.

* cited by examiner

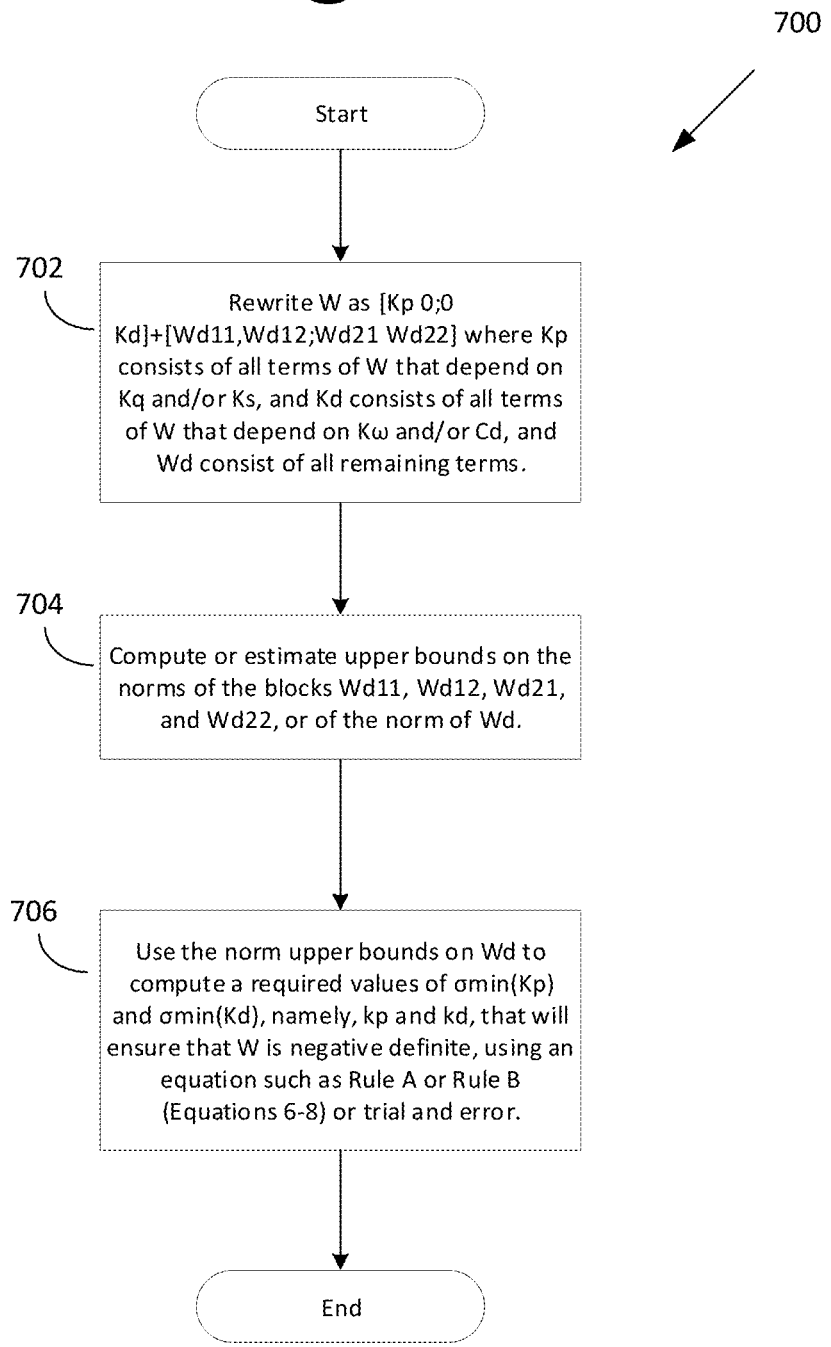

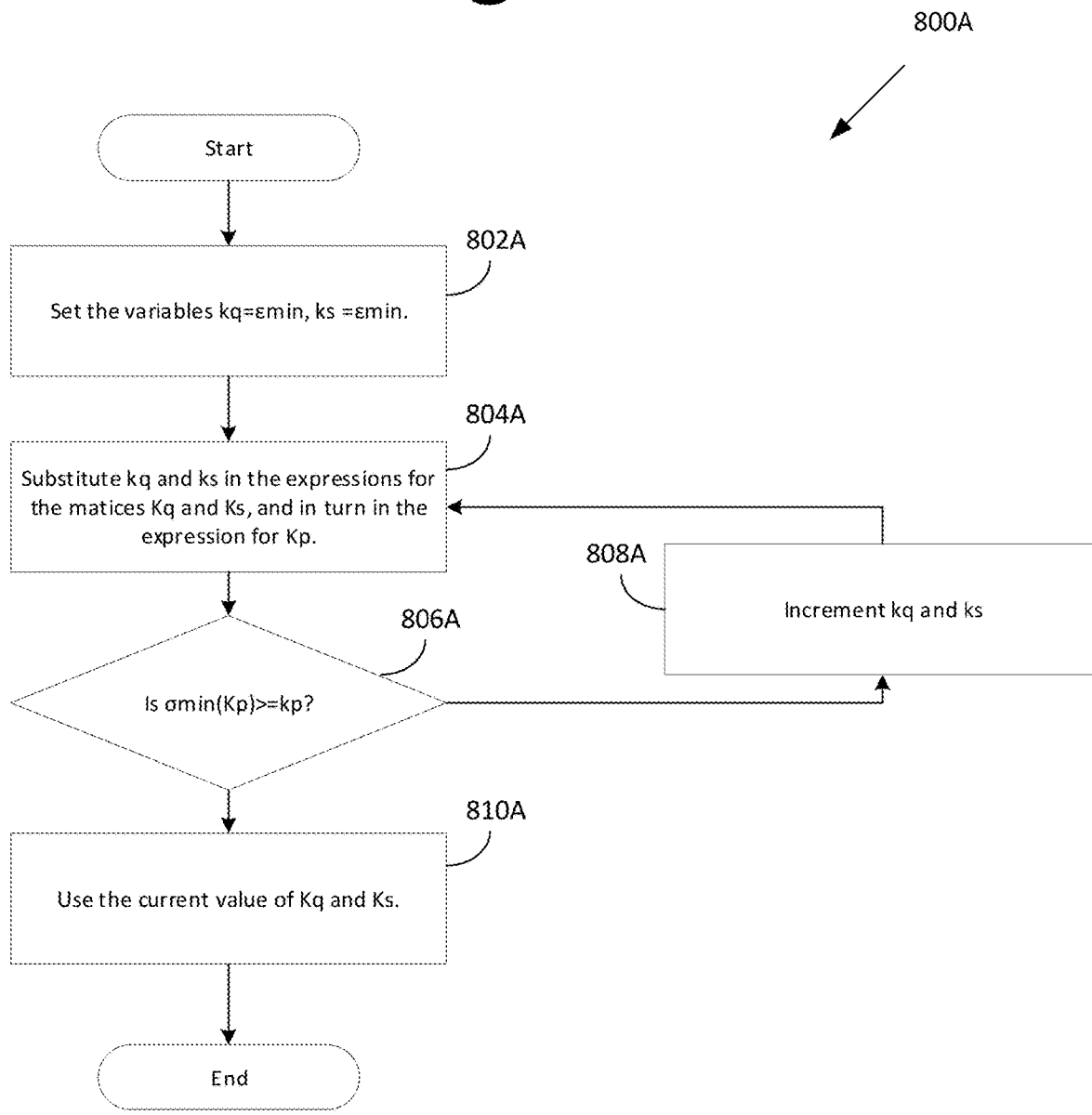

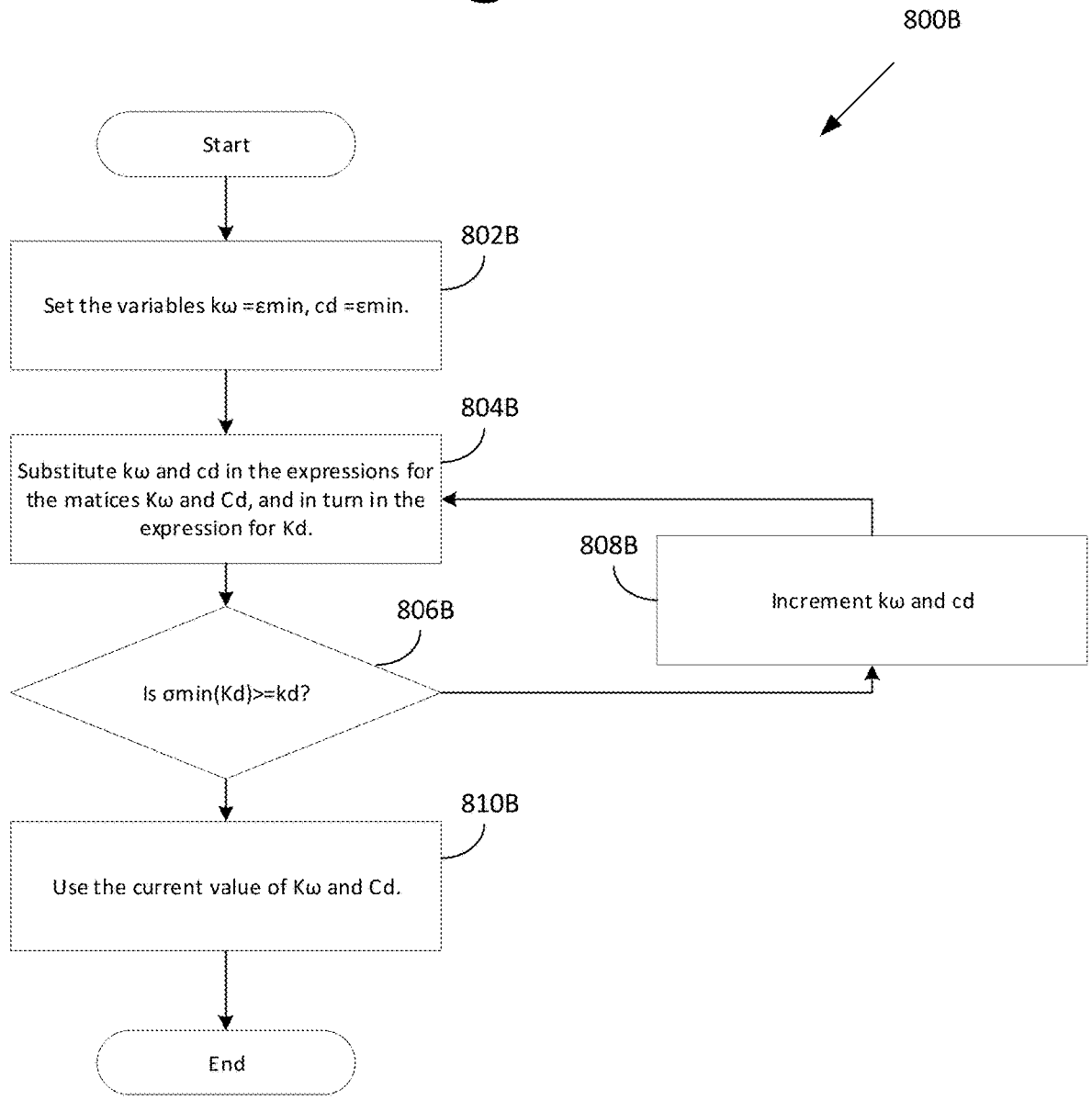

DISTRIBUTED ATTITUDE CONTROL
SYSTEM FOR RECONFIGURABLE
SPACECRAFT COMPOSED OF JOINED
ENTITIES WITH COMPLIANT COUPLING

FIELD

The present invention relates to a distributed attitude control system (ACS) and, more particularly, to a distributed ACS configured to distribute functions among a plurality of joined entities in a space architecture.

BACKGROUND

Currently, reconfigurable joined entities attached and detach by a single ACS. For instance, satellites are structurally connected during launch, and after separation from a launch vehicle, nodal separation between the satellites is established, allowing the satellites to drift into different orbits and to operate autonomously.

Some systems include an ACS for soft hybrid isolation systems. For example, a non-contacting actuator and a passive mechanical system are in parallel between the bus and payload. In these systems, the mounting of the payload on passive dampers cause an unstable mode.

In other systems, a satellite assembly has modular common bus components. In these systems, satellites are composed of modular subsystems, and are attached permanently or temporarily. Temporary attachment of the modular systems allows for the satellites to be launched together and then separate into multiple satellites.

However, these systems lack an ACS function distributed among the multiple joined entities in a space architecture. Such a system with these functionality may be more beneficial.

SUMMARY

Certain embodiments of the present invention may provide solutions to the problems and needs in the art that have not yet been fully identified, appreciated, or solved by current ACS systems.

In an embodiment, a process to design an attitude control system (ACS) controller in each of a plurality of joined entities includes identifying a worst case configuration as a design-to configuration as one or more configurations in a given set S of configurations required for a spacecraft. For the design-to configuration, the process includes deriving one or more system equations in a functional form of equations to determine intermediate design parameters that represent effective proportional and derivative gains of the combined controller, Kp and Kd, respectively. The process also includes determining the design parameters of the ACS controller, namely, gains Kq and Kω and stiffness and damping coefficients, Ks and Cd respectively of all the interfaces between each of the plurality of joined entities, from the intermediate design parameters Kp and Kd. The process further includes programming the ACS controller with selected values of the design parameters for matrices Kq and Kω and selecting springs with stiffness Ks and dampers with damping coefficient Cd for all interfaces between each of the plurality of joined entities. The process includes iterating the computer-implemented process after incrementing a convergence requirement parameter othreshold when the control performance is not acceptable and until the system achieves acceptable performance, and programming the ACS controller for each of the plurality of joined entities.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 7 is a flow diagram illustrating a process for selecting the design parameters, according to an embodiment of the present invention.

FIG. 8A, which is a flow diagram illustrating a process 800A for selecting the design parameters Kq and Ks, according to an embodiment of the present invention.

FIG. 8B is a flow diagram illustrating a process 800B for selecting design parameters Kω and Cd, according to an embodiment of the present invention.

DETAILED DESCRIPTION OF THE EMBODIMENTS

One or more embodiments pertain to distributed ACS functions among a plurality of joined entities in a space architecture. For example, some embodiments include a distributed ACS for a structure that includes a three-dimensional array of notional shaped structures. For purposes of explanation, joined entities will be used since it is easiest to articulate the embodiments described herein. Joined entities in some embodiments may include satellites such as cube satellites. The joined entities are coupled at interface junctions that include a compliant coupling scheme. The couplings are, in some embodiments, equipped with sensors. The sensors in some embodiments output physical changes in the coupling. The attitude control algorithm runs on control processors located on a subset of the joined entities ensemble. The joined entities are equipped with attitude sensors and actuators, which are also driven by the control electronics. In some embodiments, the control electronics on the various joined entities communicate with each other and with some joined entities having more of a supervisory control than others. The joined entities, where the control electronics are not activated, are passively stabilized by forces in the compliant coupling. In some embodiments, the control algorithm includes feed forward terms for the forces and torques exerted by the compliant coupling, which are modeled based on the sensor outputs from the compliant couplings.

Figure 1:
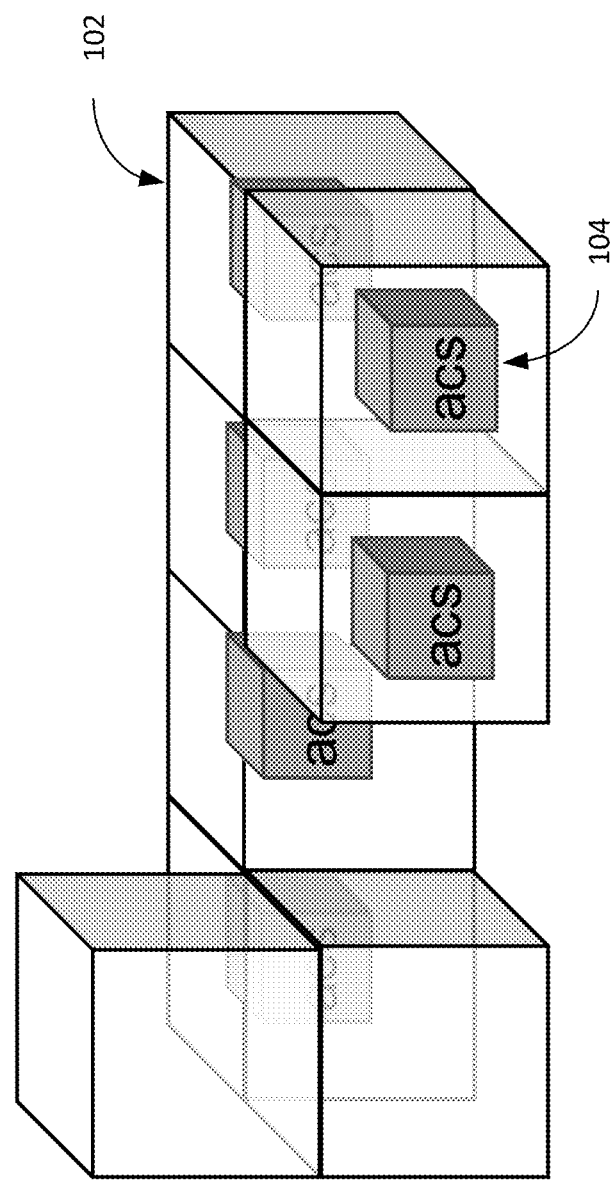
FIG. 1 is a block diagram illustrating a spacecraft composed of a joined array of entities, according to an embodiment of the present invention.

FIG. 1 is a block diagram illustrating a spacecraft 100 composed of an array of joined entities 102, according to an embodiment of the present invention. In this embodiment, joined entities 102 are actuated by reaction wheel assemblies on a subset of active joined entities. Active joined entities may be defined as entities containing ACS modules, which may include attitude sensors, processors and attitude actuations. Inactive joined entities may be defined as entities which are not furnished with ACS modules. In some embodiments, joined entities 102 are connected by a compliant interface to damp out oscillations caused by actuator jitters. The compliant interface may contain one or more sensors configured to estimate the forces and torques exerted by the interface.

Rather than the typical configurations, where the attitude control functionality is controlled by a single joined entity, the attitude control functionality in certain embodiments is distributed over multiple joined entities. For example, each joined entity 102 includes an ACS 104. By distributing the attitude control functionality among joined entities 102, the nominal torque required for station-keeping or attitude maneuvers is divided among the numerous actuator assemblies. Further, the lower torque rating enables miniaturization of the attitude actuators, and allows the system to be scaled without constraints imposed by actuator capacities and inertia properties.

Figure 2:
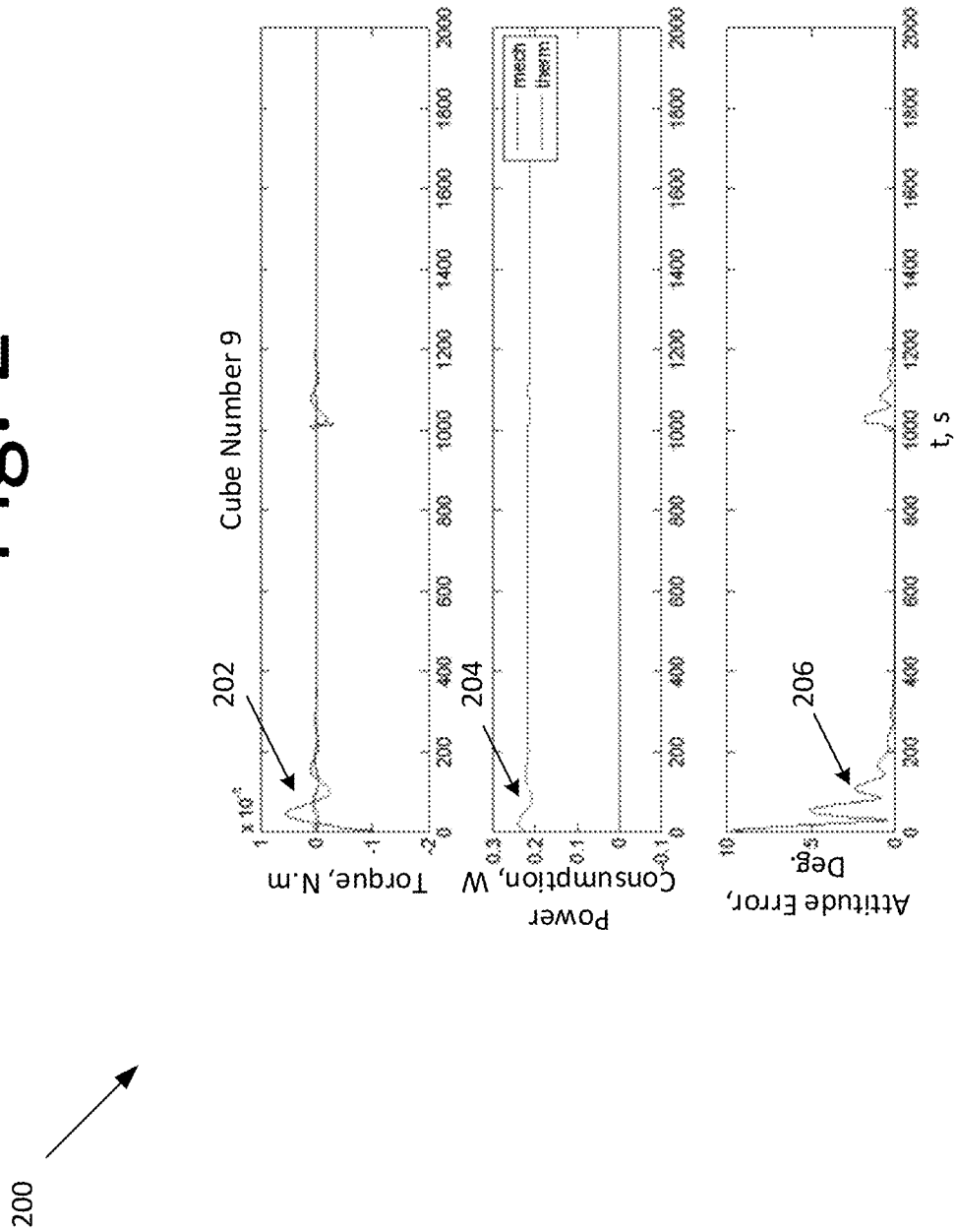
FIG. 2 illustrates a sample output from the ACS algorithm, according to an embodiment of the present invention.

FIG. 2 illustrates a sample output 200 from the ACS algorithm, according to an embodiment of the present invention. Plots 202, 204, 206 depict a control torque computed by the ACS algorithm, and angular velocities and attitudes of all joined entities under the influence of these control torques. These quantities were generated using a numerical simulation of the entire system. Plots 202, 204, 206 further show that the angular velocities converge to zero and the attitudes all converge to the desired attitude.

Figure 3:
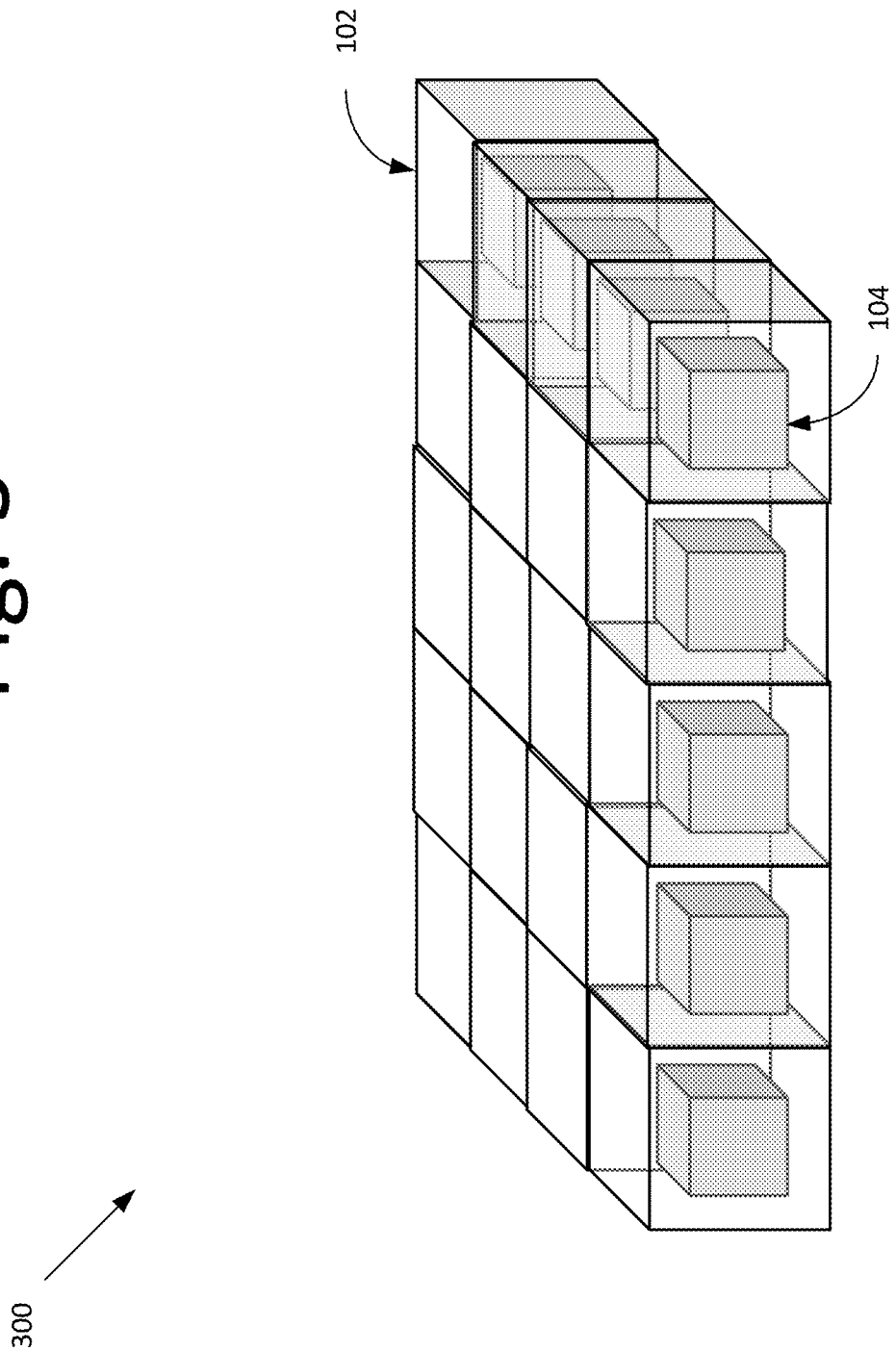
FIG. 3 is a block diagram illustrating a configuration of joined entities, according to an embodiment of the present invention.

FIG. 3 is a block diagram illustrating a configuration 300 of joined entities 102, according to an embodiment of the present invention. Similar to FIG. 1, each joined entity 102 contains ACS 104 configured control the attitude functionality. For n number of joined entities 102, the total moment of inertia is greater than n*l, where l is the moment of inertia of an individual joined entity about its center of mass. Further, torque capacity is equal to m*T, wherein m≤n, being the number of active joined entities and T is the torque capacity of each active joined entities.

Figure 4:
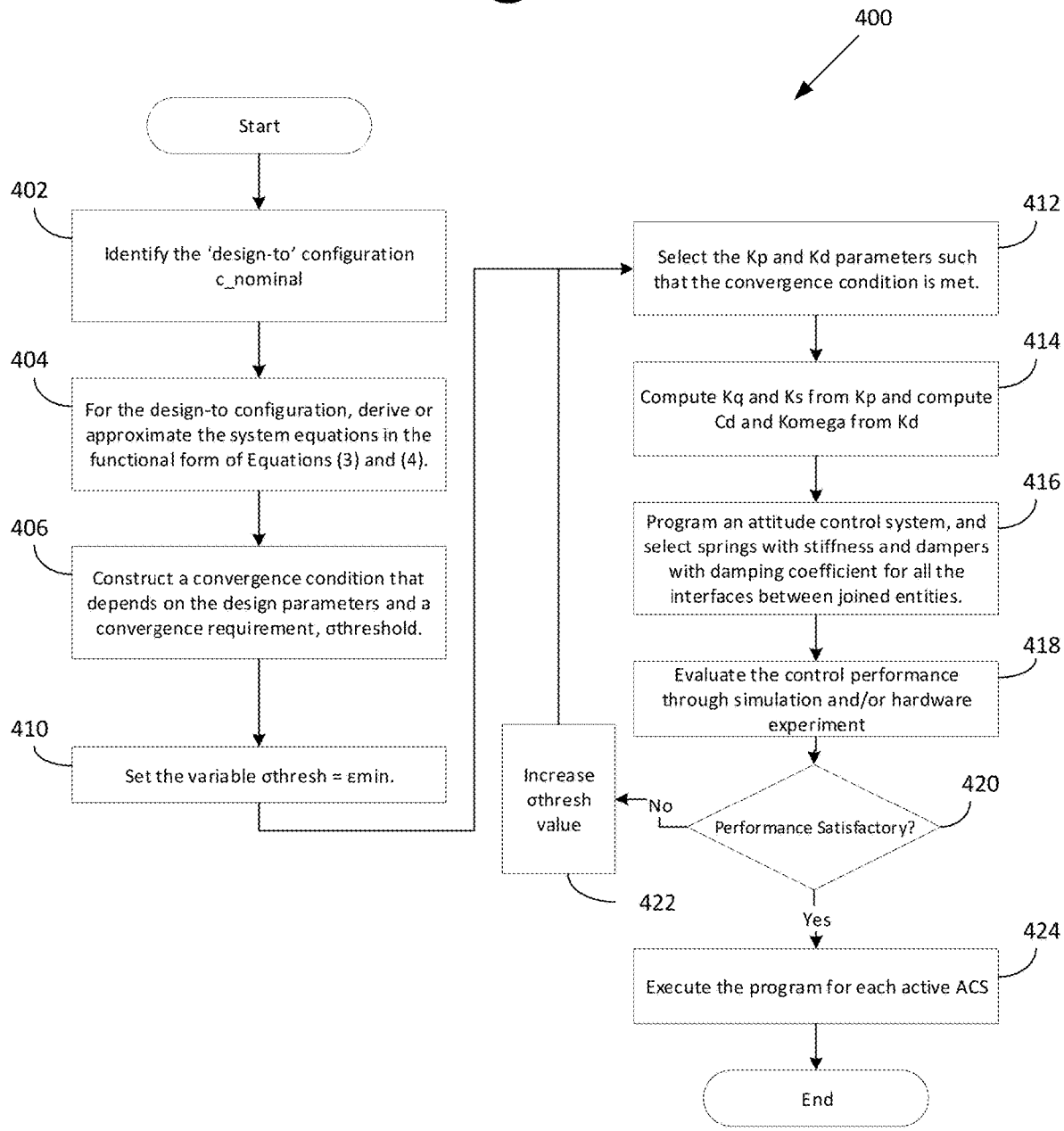
FIG. 4 is a flow diagram illustrating a process for selecting the design parameters of an ACS system to ensure stability of an ACS controller, according to an embodiment of the present invention.

FIG. 4 is a flow diagram illustrating a process 400 to select the design parameters of the ACS system to ensure stability of the ACS controller, according to an embodiment of the present invention. In an embodiment, process 400 pertains to the selection of the design parameters of the ACS system, namely, the interface stiffnesses (K) and damping coefficients (C), and the selection of the control algorithm gains, namely $K_\omega$ and $K_q$.

Prior to beginning, the following requirements should be known in certain embodiments. This includes number of joined entities (N), mass of joined entities (m), moment of inertia of joined entities (J), maximum asymmetry (Jm) and dimensions of all joined entities, matrix (G) of active joined entities, set S of allowable configurations for the joined entities, constant trajectory angular velocity (wo), tolerance factor εmin with all joined entities having the same value, for example. The constant trajectory angular velocity (ωo) is a single value, meaning all joined entities have same value, and the tolerance factor εmin is also a single value with all joined entities having the same value.

Figure 5:
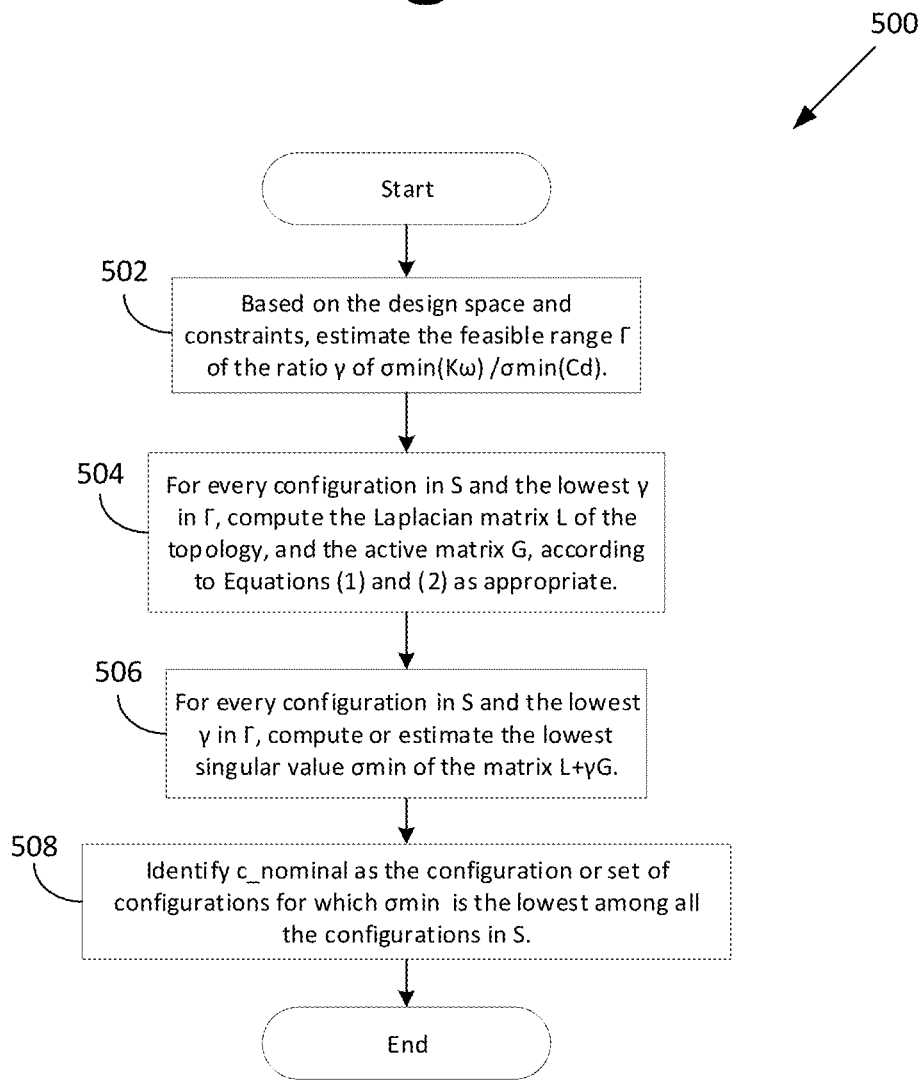
FIG. 5 is a flow diagram illustrating a process for identifying the 'design-to' configuration, according to an embodiment of the present invention.

At 402, the computing system identifies a 'design-to' configuration c_nominal using the Laplacian matrices and G matrices of all configurations in set S. The reason for this step is to select a configuration where the attitude control has the least effect on the structure, and design for this worst case. See, for example, FIG. 5, which is a flow diagram illustrating a process 500 for identifying the 'design-to' configuration.

In some embodiments, computing system at 502 estimates a feasible range Γ of the ratio γ of σmin(Kω)/σmin(Cd) based on the design space and constraints, namely, the range of available dampers for use in the interfaces between joined entities, and the limits on control gain Kω imposed by the torque capacity of the ACS actuators and the range of expected angular velocities of the spacecraft.

At 504, for every configuration in set S and the lowest γ in range Γ, the computing system computes the Laplacian matrix L of the topology, and the active matrix G, according to Equations (1) and (2) respectively, as appropriate. At 506, for every configuration in set S and the lowest γ in range Γ, the computing system computes or estimates the lowest singular value σmin of the matrix L+γG. At 508, the computing system identifies c_nominal as the configuration or set of configurations for which σmin is the lowest among all the configurations in set S.

Let the element of L in row i and column j be $L_{ij}$, given by $$L_{ij} = \begin{cases} \sum_{i,k \in \{1,\ldots,n\}} a_{ik}, & \text{if } i = j \\ -a_{ij}, & \text{if } i \neq j \end{cases} \quad \text{Equation (1)}$$

where $$a_{ij} = \begin{cases} 1, & \text{if } i \neq j \text{ and joined entity } i \text{ is connected to joined entity } j \\ 0, & \text{otherwise} \end{cases}.$$

Let the element of G in row i and column j be $G_{ij}$ given by $$G_{ij} = \begin{cases} 1, & \text{if } i = j \text{ and joined entity } i \text{ is active} \\ 0, & \text{otherwise} \end{cases} \quad \text{Equation (2)}$$

Returning to FIG. 4, at 404, for the 'design-to' configuration, the computing system derives the system equations in functional form of Equations (3) and (4). System equations may include dynamical system equations, where the rate of change of state is equal to some function of the state. So, if the state was the positions, orientations, velocities and angular velocities of every joined entity, then the system equations would produce the rate of change of the state as a function of the state vector.

A common functional form for the system equations is as follows:

$$\dot{q} = Qv \quad \text{Equation (3)}$$

$$M\dot{v}+Cv=F_i(x,v)+F_c(x,v) \quad \text{Equation (4)}$$

where q is a vector of the positions and orientations of all the joined entities, v is a vector of the velocities and angular velocities of all joined entities, M is a matrix of masses and moments of inertia of all joined entities, $F_i$ (x, v) is a vector of the interaction forces and torques due to the couplings between entities, $F_c$(x, v) is a vector of the control forces and torques applied by the ACS, and Q and C are matrices that can be derived for specific systems from the commonly-used Newton-Euler or Lagrangian equations. The forces are given by the expressions:

$$F_i(x,v)=-K_s x-C_d v$$

$$F_c(x,v)=-kron(G,K_q)x-kron(G,K_\omega)v$$

where the matrices $K_s$, $C_d$, $K_q$, and $K_\omega$ are design parameters to be selected in the subsequent steps of the process, and are the interface stiffness, interface damping coefficient, ACS control gain for the proportional (orientation-dependent) term, and ACS control gain for the derivative (angular velocity-dependent) term respectively. At 406, the computing system constructs a convergence condition from the system equations, using the well-known linear or nonlinear techniques from control theory. The convergence condition contains all the design parameters, as well as a convergence requirement, σthreshold, which is a positive number that will be adjusted during the design process. The convergence requirement quantifies the 'aggressiveness' of the control, in that for a given amount of pointing error, the higher the σthreshold, the more control effort will be expended by the controller. Increasing the σthreshold typically results in better control performance and lower attitude error.

If linear techniques such as pole-placement are used, the computing system constructs the linearized system equations, which may take the following functional form:

$$\begin{bmatrix} \dot{X} \\ \dot{V} \end{bmatrix} = \begin{bmatrix} 0 & Q \\ M^{-1}(-K_s - kron(G, K_q)) & M^{-1}(-C_d - kron(G, K_\omega)) \end{bmatrix} \begin{bmatrix} X \\ V \end{bmatrix}$$

The convergence condition is then: all the real parts of all eigenvalues of the matrix $$\begin{bmatrix} 0 & Q \\ M^{-1}(-K_s - kron(G, K_q)) & M^{-1}(-C_d - kron(G, K_\omega)) \end{bmatrix}$$

(or its constant approximation) must be less than −σthreshold.

Figure 6:
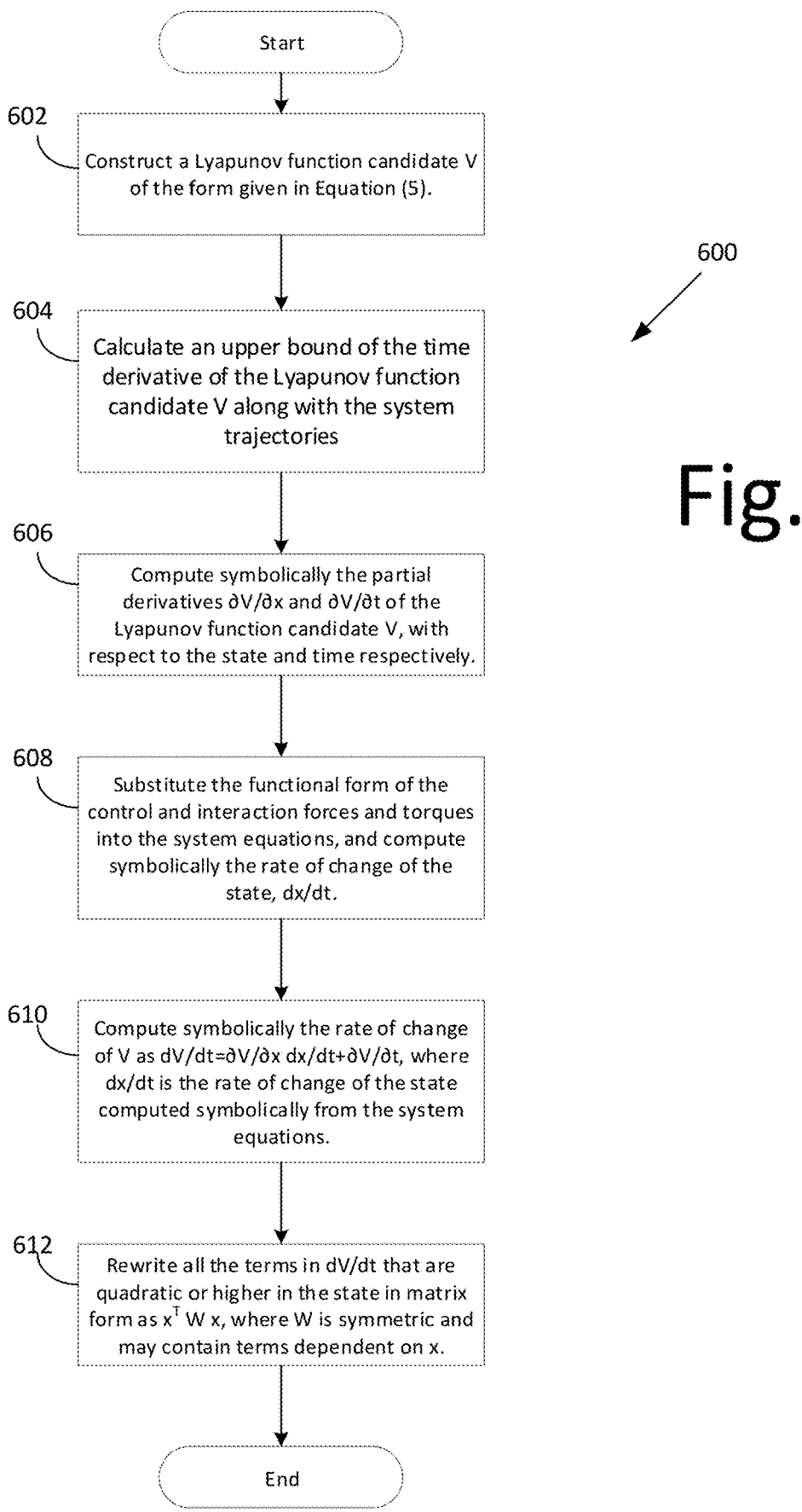
FIG. 6 is a flow diagram illustrating a process for computing the matrix W, according to an embodiment of the present invention.

Alternatively, nonlinear techniques such as Lyapunov's Direct Method may be used to construct the convergence condition, as shown in FIG. 6. At 602, the computing system constructs a Lyapunov function candidate V with the following form $$V=v^T Mv+\epsilon v^T Mq+q^T Pq \quad \text{Equation (5)}$$

where parameter $\epsilon$ and the matrix P must satisfy the condition that the matrix $$\begin{bmatrix} M & \epsilon M \\ \epsilon M & P \end{bmatrix}$$

is positive definite. The reason for this step is to use the commonly-used Lyapunov's Direct Method to construct a convergence condition. At 604, the computing system calculates an upper bound of the time derivative of the Lyapunov function candidate V along with the system trajectories of the form $x^T W x$. In an embodiment, x is the state of the system and W is a matrix computed from the system equations using the process shown in FIG. 6. The convergence condition is then that W must be negative definite, and all the singular values of W must be greater than σthreshold.

At 606, the computing system symbolically computes the partial derivatives ∂V/∂x and ∂V/∂t of the Lyapunov function candidate V, with respect to the state and time respectively. At 608, the computing system substitutes the functional form of the control and interaction forces and torques into the system equations, and symbolically computes the rate of change of the state dx/dt. At 610, the computing system symbolically computes the rate of change of V as dV/dt=∂V/∂x dx/dt+∂V/∂t. In some embodiments, partial derivative dx/dt is the rate of change of the state computed from the system equations. At 612, the computing system rewrites the terms in partial derivative dV/dt that are quadratic or higher in the state in matrix form as $x^T W x$, where W is symmetric and may contain terms dependent on x. The convergence condition is some embodiments may be as follows: the matrix W is a negative definite, and all the singular values of W are greater than σthreshold.

Returning to FIG. 4, at 410, the computing system sets the variable σthreshold to tolerance factor εmin. At 412, the computing system selects design parameters Kq and Ks such that the convergence condition is met. One iterative process that may be used for this selection is shown in FIG. 7. Alternatively, analytic formulas, heuristics or rules of thumb may be derived and used to select the design parameters.

FIG. 7 is a flow diagram illustrating a process 700 for selecting the design parameters, according to an embodiment of the present invention.

In some embodiments, the computing system at 702 rewrites W as $$\begin{bmatrix} Kp & 0 \\ 0 & K_d \end{bmatrix} + \begin{bmatrix} Wd11 & Wd12 \\ Wd21 & Wd22 \end{bmatrix},$$

where, in this embodiment, the matrix Kp includes all terms of W that depend on elements of Kq and/or Ks, the matrix Kd includes all terms of W that depend on elements of Kω and/or Cd, and the matrix Wd includes all the remaining terms. At 704, the computing system computes or estimates the upper bounds on the norms of the blocks Wd11, Wd12, Wd21, and Wd22, or of the norm of Wd. At 706, the computing system uses the norm upper bounds on Wd to compute the required values of σmin(Kp) and σmin(Kd), namely, kp and kd, to ensure that W is negative definite, using analytic conditions such as Rule A or Rule B given below, or by trial and error.

Rule A:

$$(k_p-\|W_{d11}\|)(k_d-\|W_{d22}\|)-4(\|Wm_{d12}\|m_{\gamma v}+\|W_{d12}\|m_{vv})>0 \quad \text{Equation (6)}$$

Rule B:

$$k_d-\|W_{d21}\|-\|W_{d22}\|>0, \text{ and} \quad \text{Equation (7)}$$

$$k_p-\|W_{d11}\|-\|W_{d12}\|>0. \quad \text{Equation (8)}$$

Returning to FIG. 4, the computing system, at 414, computes the design parameters Kq and Ks and the design parameters Kω and Cd from the intermediate design parameters Kp and Kd, respectively. In this embodiment, the design parameters Kq, Ks, Cd, Kω are computed in a manner that ensures that the time derivative of Lyapunov function candidate V is negative along the system trajectories whenever there is error in the state, using flow diagram shown in process 800A of FIG. 8A or process 800B of FIG. 8B. The reason for this step is to implement and test the control system that was designed by control theoretical techniques.

FIG. 8A, which is a flow diagram illustrating a process 800A for selecting the design parameters Kq and Ks, according to an embodiment of the present invention. In this embodiment, the computing system at 802A sets the variables kq=εmin and ks=εmin. At 804A, the computing system substitutes kq and ks in the expressions for the matrices Kq and Ks, and in turn, in the expression for Kp. At 806A, the computing system determines if σmin(Kp)>=kp, and if so, at 808A, the computing system uses the current value of Kq and Ks. Otherwise, at 810A, the computing system increments kq and ks and returns to 804.

FIG. 8B is a flow diagram illustrating a process 800B for selecting design parameters Kω and Cd, according to an embodiment of the present invention. In this embodiment, the computing system at 802B sets the variables kω=εmin and cd=εmin. At 804B, the computing system substitutes kω and cd in the expressions for the matrices Kω and Cd, and in turn, in the expression for Kd. At 806B, the computing system determines if σmin(Kd)>=kd, and if not, at 808B, the computing system increments kω and cd. Otherwise, at 810B, the computing system uses the current value of Kω and Cd.

Returning for FIG. 4, at 416, the computing system programs the attitude control system with selected values of design parameters Kq and Kω, and also selects the springs with stiffness Ks and dampers with damping coefficient Cd for all interfaces between joined entities. At 418, the computing system evaluates the control performance of the joined entities by way of simulation and/or hardware experiment.

In the evaluation step, if simulation experiments are used, then a numerical simulation program that integrates the system equations is used. In the simulation, $F_c$ (x, v) and $F_i$ (x, v) are programmed according to formulas that use the selected design parameters.

If hardware experiments are used, then an apparatus comprising of the joined entities in the design-to configuration is instrumented so that the state of the apparatus can be measured or estimated. The ACS modules on the joined entities are programmed with the selected design parameters and the ACS algorithm is executed, with the actuators applying the control forces and torques on the joined entities.

From the numerical simulation output and/or hardware instrumentation, performance parameters including the rate of convergence of error, and the duration and amplitude of transient oscillations are estimated. If these performance parameters meet the requirements of the spacecraft system, the performance is deemed satisfactory.

At 420, if the performance is deemed satisfactory, then the computing system executes the programmed attitude control system for each joined entity at 424. Otherwise, at 422, the computing system increases the σthreshold and the flow diagram returns to step 412.

Figure 9:
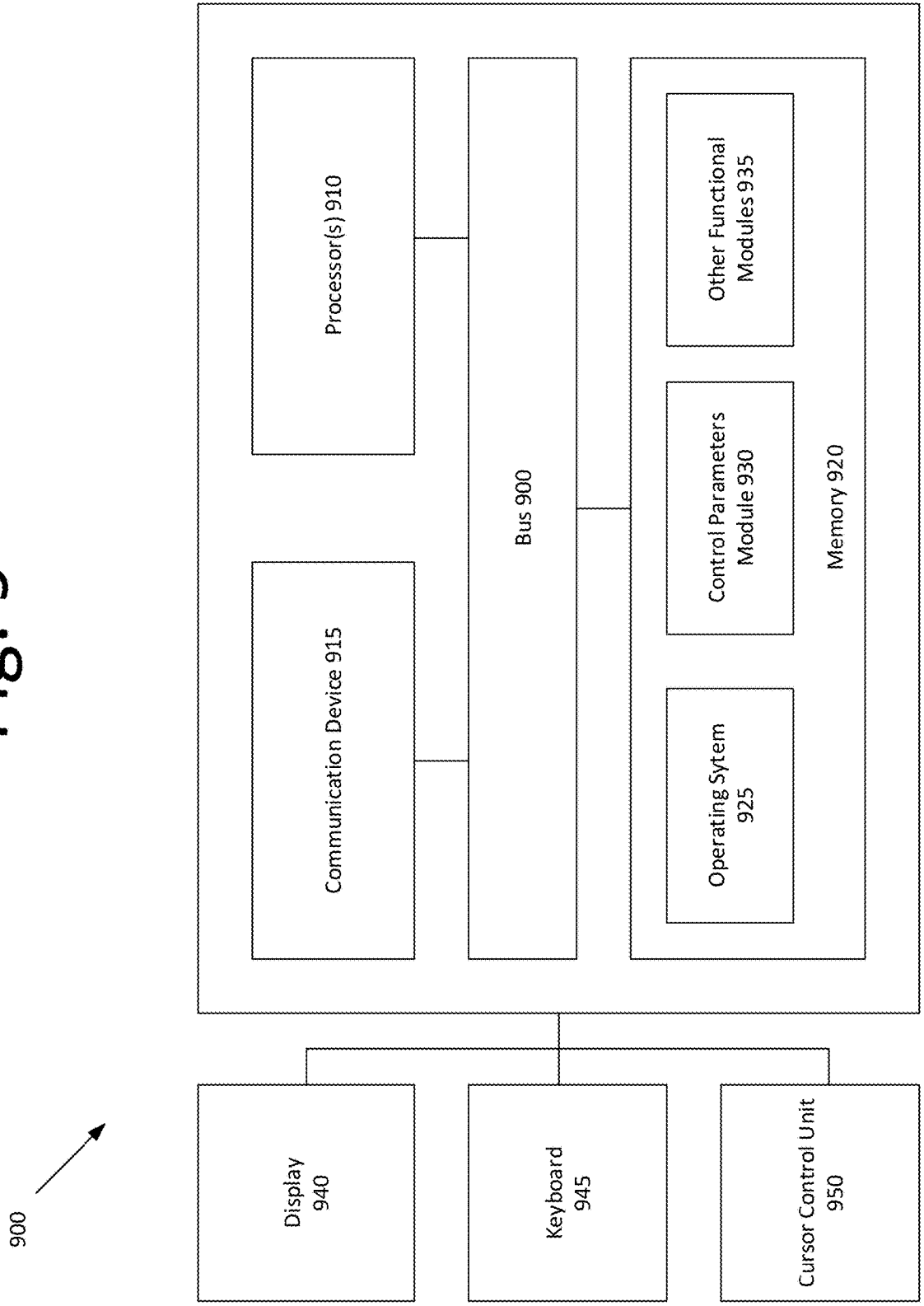
FIG. 9 is a block diagram illustrating a computing system configured to execute the flow diagrams of FIGS. 4-8B, according to an embodiment of the present invention.

FIG. 9 illustrates a block diagram of a computing system 900 configured to execute the flow diagrams of FIGS. 4-8B, according to one embodiment of the present invention.

Computing system 900 may include a bus 905 or other communication mechanism configured to communicate information, and at least one processor 910, coupled to bus 905, configured to process information. At least one processor 910 can be any type of general or specific purpose processor. Computing system 900 may also include memory 920 configured to store information and instructions to be executed by at least one processor 910. Memory 920 can be comprised of any combination of random access memory ("RAM"), read only memory ("ROM"), static storage such as a magnetic or optical disk, or any other type of computer readable medium. Computing system 900 may also include a communication device 915, such as a network interface card, configured to provide access to a network.

The computer readable medium may be any available media that can be accessed by at least one processor 910. The computer readable medium may include both volatile and nonvolatile medium, removable and non-removable media, and communication media. The communication media may include computer readable instructions, data structures, program modules, or other data and may include any information delivery media.

At least one processor 910 can also be coupled via bus 905 to a display 940, such as a Liquid Crystal Display ("LCD"). Display 940 may display information to the user, such as the control parameters of the ACS. A keyboard 945 and a cursor control unit 950, such as a computer mouse, may also be coupled to bus 905 to enable the user to interface with computing system 900.

According to one embodiment, memory 920 may store software modules that may provide functionality when executed by at least one processor 910. The modules can include an operating system 925 and a control parameters module 930, as well as other functional modules 935. Operating system 925 may provide operating system functionality for computing system 900. Because computing system 900 may be part of a larger system, computing system 900 may include one or more additional functional modules 935 to include the additional functionality.

One skilled in the art will appreciate that a "system" could be embodied as a personal computer, a server, a console, a personal digital assistant (PDA), a cell phone, a tablet computing device, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The process shown in FIGS. 4-8A may be performed, in part, by a computer program, encoding instructions for a nonlinear adaptive processor to cause at least the process described in FIGS. 4-8A to be performed by the apparatuses discussed herein. The computer program may be embodied on a non-transitory computer readable medium. The computer readable medium may be, but is not limited to, a hard disk drive, a flash device, a random access memory, a tape, or any other such medium used to store data. The computer program may include encoded instructions for controlling the nonlinear adaptive processor to implement the process described in FIGS. 4-8A, which may also be stored on the computer readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, or an application specific integrated circuit ("ASIC").

Some embodiments enable low-cost, repairable, refurbish-able, reconfigurable missions that have strict pointing requirements. By distributing the attitude control functionality over multiple joined entities, the requirement on a single entity to provide attitude control for the entire structure is relaxed. This reduced requirement on the power, torque rating and miniaturization of the attitude actuators, in turn, enables the construction of larger structures than would otherwise be possible.

In an embodiment, a computer-implemented process to design an ACS controller in each of a plurality of joined entities. The computer-implement process may include identifying a worst case configuration as a design-to configuration as one or more configurations in a given set S of configurations required for a spacecraft. The computer-implement process may also include, for the design-to configuration, deriving one or more system equations in a functional form of equations to determine intermediate design parameters that represent effective proportional and derivative gains of the combined controller, Kp and Kd, respectively. The computer-implement process may further include determining the design parameters of the ACS controller. The design parameters comprise includes Kq and Kω and stiffness and damping coefficients, Ks and Cd respectively of all the interfaces between each of the plurality of joined entities, from the intermediate design parameters Kp and Kd. The computer-implement process may include programming the ACS controller with selected values of the design parameters for matrices Kq and Kω and selecting springs with stiffness Ks and dampers with damping coefficient Cd for all interfaces between each of the plurality of joined entities. The computer-implement process may also include iterating the computer-implemented process after incrementing a convergence requirement parameter σthreshold when the control performance is not acceptable and until the system achieves acceptable performance, and programming the ACS controller for each of the plurality of joined entities.

In some further embodiments, the identifying of the design-to configuration uses Laplacian matrices and G matrices for the one or more configurations in the set S.

In yet some further embodiments, the computer-implement process may include estimating a feasible range Γ of a ratio γ of σmin(Kω)/σmin(Cd) based on design space and constraints, where Kω is a parameter for ACS controller gain and Cd is a design parameter for a damping coefficient.

In some embodiments, the computer-implement process may include for every configuration in the set S and for lowest γ in range Γ, computing a lowest singular value σmin of matrix L+γG. The matrix L+γG is an estimate of the coefficient A of a state in a state-derivative expression or in a state-space representation of the system dynamics of the from $\dot{x}=A\,x$.

Also, in some embodiments, the computer-implemented process includes identifying a c_nominal as the design-to configuration or a set of design-to configurations for which σmin is lowest among all the configurations in the set S. The c_nominal is a worst-case configuration in which errors in a state are least affected by a control effort.

In certain embodiments, the computer-implemented process includes constructing a convergence condition using one or more control theory concepts or by constructing a Lyapunov function candidate V as defined by $$V = v^T M v + \epsilon v^T M q + q^T P q$$

where parameter $\epsilon$ and matrix P satisfies a condition that matrix $$\begin{bmatrix} M & \epsilon M \\ \epsilon M & P \end{bmatrix}$$

is positive definite.

In yet some further embodiments, computer-implemented process includes setting a variable σthreshold to tolerance factor εmin.

Also, in some embodiments, the computer-implemented process includes selecting intermediate design parameters Kp and Kd such that W is a negative definite and has a minimum singular value σmin>σthreshold.

In some further embodiments, computer-implemented process includes computing design parameters Kq and Ks and design parameters Kω and Cd from design parameters Kp and Kd, respectively.

Also, in some embodiments, the computer-implemented process includes evaluating a control performance for each of the plurality of joined entities via computer simulation, hardware experiment, or both.

It should also be appreciated that the embodiments are not limited to space missions, but may be applied to underwater tools, terrestrial robots, road vehicles, and airborne vehicles to name a few.

It will be readily understood that the components of various embodiments of the present invention, as generally described and illustrated in the figures herein, may be arranged and designed in a wide variety of different configurations. Thus, the detailed description of the embodiments, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented process to design an attitude control system (ACS) controller in each of a plurality of joined entities, and a mechanical control system (MCS) in each joint between joined entities, to meet a given design acceptance criterion, the computer-implemented process comprising:
identifying a worst case configuration as a design-to configuration as one or more configurations in a given set S of configurations required for a spacecraft;
for the design-to configuration, deriving one or more system equations in a functional form of equations to determine intermediate design parameters that represent effective proportional and derivative gains of a combined ACS and MCS, $K_p$ and $K_d$, respectively;
determining the intermediate design parameters of the ACS controller, wherein the intermediate design parameters comprise gain matrices $K_q$ and $K_\omega$ and stiffness coefficient and damping coefficient, $K_s$ and $C_d$, respectively, of all the interfaces between each of the plurality of joined entities, from the intermediate design parameters $K_p$ and $K_d$, where the gain matrix $K_q$ is a proportional gain matrix of all ACS controllers and the gain matrix $K_\omega$ is a derivative gain matrix of all the ACS controllers;
programming the ACS controller with selected values of the intermediate design parameters for the gain matrices $K_q$ and $K_\omega$ and selecting springs with stiffness coefficient $K_s$ and dampers with damping coefficient $C_d$ for all interfaces between each of the plurality of joined entities;
iterating the computer-implemented process after incrementing a convergence requirement parameter σthreshold when an estimated control performance does not meet the design acceptance criterion and until mechanical system dynamics meets the design acceptance criterion; and
programming the ACS controller for each of the plurality of joined entities, causing ACS functions to be distributed among the plurality of joined entities in a space architecture.

2. The computer-implemented process of claim 1, wherein the identifying of the design-to configuration uses Laplacian matrices and G matrices for the one or more configurations in the set S, wherein G matrices are a diagonal matrix where a diagonal element is 1 if a joined entity corresponding to that index is active, otherwise the diagonal element is 0.

3. The computer-implemented process of claim 1, further comprising:
estimating a feasible range $\Gamma$ of a ratio $\gamma$ of $\sigma min(K_\omega)/\sigma min(C_d)$ based on design space and constraints, wherein
$K_\omega$ is a derivative gain matrix of all the ACS controllers and $C_d$ is an intermediate design parameter for a damping coefficient,
σmin is a function that returns a minimum singular value of a matrix.

4. The computer-implemented process of claim 1, further comprising:
for every configuration in the set S and for lowest $\gamma$ in range $\Gamma$, computing a lowest singular value σmin of matrix $L+\gamma G$, wherein
the matrix $L+\gamma G$ is an estimate of the coefficient A of a state in a state-derivative expression or in a state-space representation of the mechanical system dynamics of the form $\dot{x}=A x$, the mechanical system dynamics being a model of a closed loop system comprising the ACS, MCS and all joined entities,
the matrix L is a Laplacian matrix of a topology,
A is a linear dynamic coefficient of $\dot{x}$,
x is a vector of position, orientation, velocity, and angular velocity of all joined entities, and
$\dot{x}$ is a rate of change of x.

5. The computer-implemented process of claim 1, further comprising:

identifying a c_nominal as the design-to configuration or a set of design-to configurations for which σmin is lowest among all the configurations in the set S, wherein the c_nominal is a worst-case configuration in which errors in a state are least affected by a control effort.

6. The computer-implemented process of claim 1, further comprising:

constructing a convergence condition using one or more control theory concepts or by constructing a Lyapunov function candidate V as defined by $$V = v^T M V + \epsilon v^T M q + q^T P q$$

where parameter E and matrix P satisfy a condition that matrix $$\begin{bmatrix} M & \epsilon M \\ \epsilon M & P \end{bmatrix}$$

is positive definite, v is a vector of velocity and angular velocity of all joined entities, $^T$ is a transpose operator, M is a matrix of masses and moments of inertia of all joined entities, and q is a vector of position and orientation of all joined entities.

7. The computer-implemented process of claim 1, further comprising:

setting a variable σthreshold to tolerance factor εmin.

8. The computer-implemented process of claim 1, further comprising:

selecting the intermediate design parameters Kp and Kd such that W is a negative definite and has a minimum singular value σmin>σthreshold, where W is quadratic coefficient of x in a time derivative of Lyapunov function.

9. The computer-implemented process of claim 1, further comprising:

computing the gain matrix Kq and stiffness coefficient Ks and gain matrix Kω and damping coefficient Cd from the intermediate design parameters Kp and Kd, respectively.

10. The computer-implemented process of claim 1, further comprising:

evaluating a control performance for each of the plurality of joined entities via computer simulation, hardware experiment, or both.

11. A computer-implemented process to design an attitude control system (ACS) controller in each of a plurality of joined entities, the computer-implemented process comprising:

identifying a design-to configuration using Laplacian matrices and G matrices for all configurations in set S;

estimating a feasible range Γ of a ratio γ of σmin(Kω)/σmin(Cd) based on design space and constraints, wherein intermediate design parameters comprise gain matrices Kq and Kω and stiffness coefficient and damping coefficient, Ks and Cd, respectively, of all interfaces between each of the plurality of joined entities, from intermediate design parameters Kp and Kd, where the gain matrix Kq is a proportional gain matrix of all ACS controllers and the gain matrix Kω is a derivative gain matrix of all the ACS controllers;

for every configuration in the set S and for lowest γ in range Γ, computing a lowest singular value σmin of matrix L+γG, where matrix L+γG is an estimate of A, A being a linear dynamic coefficient of a state in a state-derivative expression, in a state-space representation of mechanical system dynamics;

identifying a c_nominal as the design-to configuration or a set of design-to configurations for which σmin is the lowest among all the configurations in the set S, wherein the c_nominal is the worst-case configuration in which errors in the state are the least affected by a control effort;

for the design-to configuration, deriving system equations in a functional form of equations;

constructing a convergence condition using classical control theory concepts, or by constructing a Lyapunov function candidate V as defined by $$V = v^T M v + \epsilon v^T M q + q^T P q$$

where parameter ε and matrix P satisfies a condition that matrix $$\begin{bmatrix} M & \epsilon M \\ \epsilon M & P \end{bmatrix}$$

is positive definite;

setting a variable σthreshold to tolerance factor min;

selecting the intermediate design parameters Kp and Kd such that W is a negative definite and has a minimum singular value σmin>σthreshold;

computing gain matrix Kq and stiffness coefficient Ks and the gain matrix Kω and Cd from intermediate design parameters Kp and Kd, respectively, where the gain matrix Kq is a proportional gain matrix of all ACS controllers and the gain matrix Kω is a derivative gain matrix of all the ACS controllers;

programming the ACS controller with selected values of the intermediate design parameters for gain matrices Kq and Kω and selecting springs with stiffness coefficient Ks and dampers with damping coefficient Cd for all interfaces between each of the plurality of joined entities;

evaluating a control performance for each of the plurality of joined entities via computer simulation, hardware experiment, or both;

iterating the computer-implemented process after incrementing σthreshold when the control performance is not acceptable and until the mechanical system dynamics meets a design acceptance criterion; and programming the ACS controller for each of the plurality of joined entities, causing ACS functions to be distributed among the plurality of joined entities in a space architecture.

12. The computer-implemented process of claim 11, wherein G matrix is a matrix of active joined entities.

13. The computer-implemented process of claim 11, wherein the set S is a set of allowable configurations for the plurality of joined entities, wherein the plurality of joined entities comprise active joined entities and inactive joined entities.

14. The computer-implemented process of claim 11, wherein the functional form of equations are defined by $$\dot{q} = Qv$$

$$M\dot{v} + Cv = F_i(x,v) + F_c(x,v)$$

where q is a vector of the positions and orientations of all of the plurality of joined entities, v is a vector of velocities and angular velocities of all of the plurality of joined entities, M is a matrix of masses and moments of inertia of all of the plurality of joined entities, $F_i(x, v)$ is a vector of the interaction forces and torques due to the couplings between the plurality of joined entities, $F_c(x, v)$ is a vector of the control forces and torques applied by an ACS, and Q and C are matrices that can be derived for specific systems from Newton-Euler or Lagrangian equations.

15. The computer-implemented process of claim 11, wherein the gain matrix Kq and stiffness coefficient Ks, damping coefficient Cd, gain matrix Kω are computed in a manner to ensure that a time derivative of the Lyapunov function candidate V is negative along system trajectories when there is an error in the state.

16. The computer-implemented process of claim 11, wherein the identifying of the design-to configuration comprises
  estimating a feasible range Γ of the ratio γ of σmin(Kω)/σmin(Cd) based on a design space and constraint; and
  estimating limits on gain matrix Kω imposed by the torque capacity of one or more ACS actuators and a range of expected angular velocities of a joined entity.

17. The computer implemented process of claim 16, wherein the identifying of the design-to configuration further comprises
  for every configuration in the set S and a lowest γ in range Γ, computing a Laplacian matrix L of a topology and computing an active matrix G.

18. The computer implemented process of claim 17, wherein the identifying of the design-to configuration further comprises
  for every configuration in the set S and the lowest γ in range Γ, estimating a lowest singular value σmin of matrix L+γG.

19. The computer implemented process of claim 18, wherein the identifying of the design-to configuration further comprises
  identifying c_nominal as a configuration or a set of configurations for which σmin is the lowest among all of the configurations in set S.

20. The computer implemented process of claim 11, wherein the computing of the gain matrix Kq and stiffness coefficient Ks comprises
  rewriting W as $$\begin{bmatrix} Kp & 0 \\ 0 & K_d \end{bmatrix} + \begin{bmatrix} Wd11 & Wd12 \\ Wd21 & Wd22 \end{bmatrix},$$

where
  the intermediate design parameters Kp comprise all terms of W that depend on elements of Kq, Ks, or both,
  the intermediate design parameters Kd comprises all terms of W that depend on elements of Kω, Cd, or both, and
  matrix Wd comprises all terms of W that depend on neither Kq, Ks, Kω nor Cd and/or blocks Wd11, Wd12, Wd21, and Wd22.

21. The computer implemented process of claim 20, wherein the computing of the gain matrix Kq and stiffness coefficient Ks further comprises
  estimating upper bounds on norms of the blocks Wd11, Wd12, Wd21, and Wd22, or of norm of the matrix Wd.

22. The computer implemented process of claim 21, wherein the computing of the gain matrix Kq and stiffness coefficient Ks further comprises
  using the norm upper bounds on matrix Wd to compute required values of σmin(Kp) and σmin(Kd) to ensure that W is negative definite.

23. The computer implemented process of claim 21, wherein the computing of the gain matrix Kq and stiffness coefficient Ks and the gain matrix Kω and the damping coefficient Cd from intermediate design parameters Kp and Kd comprises
  setting design parameters kq to equal εmin and ks to equal εmin,
  where the design parameter kq is a quaternion error gain parameter in an ACS and the design parameter ks is a stiffness scale factor.

24. The computer implemented process of claim 23, wherein the computing of the gain matrix Kq and stiffness coefficient Ks and the gain matrix Kω and the damping coefficient Cd from intermediate design parameters Kp and Kd further comprises
  substituting the design parameters kq and ks in the expressions for the gain matrix Kq and stiffness coefficient Ks, and in the expression for Kp.

25. The computer implemented process of claim 24, wherein the computing of the gain matrix Kq and stiffness coefficient Ks and the gain matrix Kω and damping coefficient Cd from intermediate design parameters Kp and Kd further comprises
  determining if σmin(Kp)>=kp, where kp is a required minimum singular value of the intermediate design parameter Kp; and
  when σmin(Kp)>=kp, using current value of Kq and Ks.

26. The computer implemented process of claim 11, wherein the computing of the gain matrix Kq and stiffnes coefficient Ks and the gain matrix Kω and damping coefficient Cd from intermediate design parameters Kp and Kd comprises
  setting a design parameter kω to equal εmin and cd to equal εmin, wherein
  the design parameter kω is an angular velocity error gain parameter in an ACS, and
  the design parameter cd is a damping scale factor.

27. The computer implemented process of claim 26, wherein the computing of the gain matrix Kq and stiffness coefficient Ks and the gain matrix Kω and damping coefficient Cd, where Kq is a proportional gain matrix of all ACS controllers and Kω is a derivative gain matrix of all the ACS controllers, from intermediate design parameters Kp and Kd further comprises
  substituting kω and cd in expressions for the gain matrix Kω and damping coefficient Cd, and in expression for Kd.

28. The computer implemented process of claim 27, wherein the computing of the gain matrix Kq and stiffness coefficient Ks and the gain matrix Kω and damping coefficient Cd from intermediate design parameters Kp and Kd further comprises
  determining if σmin(Kd)>=kd, where kd is a required minimum singular value of the intermediate design parameter Kd; and
  when σmin(Kd)>=kd, incrementing kω and cd.

29. A computer program embodied on a non-transitory computer-readable medium, the computer program is configured to cause a processor to execute:

identifying a worst case configuration as a design-to configuration as one or more configurations in a given set S of configurations required for a spacecraft;

for the design-to configuration, deriving one or more system equations in a functional form of equations to determine intermediate design parameters that represent effective proportional and derivative gains of a combined attitude control system (ACS) and mechanical control system (MCS), Kp and Kd, respectively;

determining the intermediate design parameters of an ACS controller, wherein the intermediate design parameters comprise gain matrices Kq and Kω and stiffness and damping coefficients, Ks and Cd respectively of all the interfaces between each of a plurality of joined entities, from the intermediate design parameters Kp and Kd, where gain matrix Kq is a proportional gain matrix of all ACS controllers and gain matrix Kω is a derivative gain matrix of all the ACS controllers;

programming the ACS controller with selected values of the intermediate design parameters for the gain matrices Kq and Kω and selecting springs with stiffness coefficient Ks and dampers with damping coefficient Cd for all interfaces between each of the plurality of joined entities;

iterating a computer-implemented process after incrementing a convergence requirement parameter σthreshold when an estimated control performance is not acceptable and until mechanical system dynamics meets a design acceptance criterion; and programming the ACS controller for each of the plurality of joined entities, causing ACS functions to be distributed among the plurality of joined entities in a space architecture.

30. The computer program of claim 29, wherein the identifying of the design-to configuration uses Laplacian matrices and G matrices for the one or more configurations in the set S.

31. The computer program of claim 29, wherein the computer program is further configured to cause a processor to execute:
estimating a feasible range Γ of a ratio γ of σmin(Kω)/σmin(Cd) based on design space and constraints, wherein
Kω is a derivative gain matrix of all the ACS controllers and Cd is an intermediate design parameter for a damping coefficient.

32. The computer program of claim 29, wherein the computer program is further configured to cause a processor to execute:
for every configuration in the set S and for lowest γ in range Γ, computing a lowest singular value σmin of matrix L+γG, wherein
the matrix L+γG is an estimate of the coefficient A of a state in a state-derivative expression or in a state-space representation of the mechanical system dynamics of the form $\dot{x}=Ax$, the mechanical system dynamics being a model of a closed loop system comprising the ACS, MCS and all joined entities, the matrix L is a Laplacian matrix of a topology,
A is a linear dynamic coefficient of $\dot{x}$,
x is a vector of position, orientation, velocity, and angular velocity of all joined entities, and
$\dot{x}$ is a rate of change of x.

33. The computer program of claim 29, wherein the computer program is further configured to cause a processor to execute:
identifying a c_nominal as the design-to configuration or a set of design-to configurations for which σmin is lowest among all the configurations in the set S, wherein
the c_nominal is a worst-case configuration in which errors in a state are least affected by a control effort.

34. The computer program of claim 29, wherein the computer program is further configured to cause a processor to execute:
constructing a convergence condition using one or more control theory concepts or by constructing a Lyapunov function candidate V as defined by $$V = v^T M v + \epsilon v^T M q + q^T P q$$

where parameter ϵ and matrix P satisfy a condition that matrix $$\begin{bmatrix} M & \epsilon M \\ \epsilon M & P \end{bmatrix}$$

is positive definite.

35. The computer program of claim 29, wherein the computer program is further configured to cause a processor to execute:
setting a variable σthreshold to tolerance factor ϵmin.

36. The computer program of claim 29, wherein the computer program is further configured to cause a processor to execute:
selecting the intermediate design parameters Kp and Kd such that W is a negative definite and has a minimum singular value σmin>σthreshold.

37. The computer program of claim 29, wherein the computer program is further configured to cause a processor to execute:
computing gain matrix Kq and stiffness coefficient Ks and the gain matrix Kω and damping coefficient Cd from the intermediate design parameters Kp and Kd, respectively.

38. The computer program of claim 29, wherein the computer program is further configured to cause a processor to execute:
evaluating a control performance for each of the plurality of joined entities via computer simulation, hardware experiment, or both.

* * * * *